(12) United States Patent
Park et al.

(10) Patent No.: US 11,707,402 B2
(45) Date of Patent: Jul. 25, 2023

(54) VISION TRAINING DEVICE FOR FUSIONAL VERGENCE AND SPATIAL VISION TRAINING

(71) Applicant: Edenlux Corporation, Gyeongsangnam-do (KR)

(72) Inventors: Sung Yong Park, Busan (KR); Kyung Hyun Noh, Busan (KR)

(73) Assignee: Edenlux Corporation, Gyeongsangnam-do (KR)

( * ) Notice: Subject to any disclaimer, the term of this patent is extended or adjusted under 35 U.S.C. 154(b) by 418 days.

(21) Appl. No.: 16/898,558

(22) Filed: Jun. 11, 2020

(65) Prior Publication Data
US 2020/0306123 A1 Oct. 1, 2020

Related U.S. Application Data

(63) Continuation of application No. PCT/KR2017/001458, filed on Dec. 12, 2017.

(51) Int. Cl.
*A61H 5/00* (2006.01)
*G06F 3/01* (2006.01)
*G09G 3/00* (2006.01)

(52) U.S. Cl.
CPC .............. *A61H 5/00* (2013.01); *G06F 3/013* (2013.01); *G09G 3/003* (2013.01);
(Continued)

(58) Field of Classification Search
CPC .............. A61H 5/00; A61H 2201/1607; A61H 2201/5007; A61H 2201/5043;
(Continued)

(56) References Cited

U.S. PATENT DOCUMENTS 9,706,910 B1 * 7/2017 Blaha ...................... A61B 3/111
2007/0200927 A1   8/2007 Krenik
(Continued)

FOREIGN PATENT DOCUMENTS

CN    101433492 A    5/2009
CN    101947158 A    1/2011
(Continued)

OTHER PUBLICATIONS

Chinese Patent Office, Office Action dated Dec. 22, 2021 in Chinese Patent Application No. 201780097617.1 (12 pages).
(Continued)

*Primary Examiner* — Girumsew Wendmagegn
(74) *Attorney, Agent, or Firm* — Trop, Pruner & Hu, P.C.

(57) ABSTRACT

It is an object of the present invention to provide a vision training device capable of performing color correction for a display and providing elaborate vision training. In order to achieve the above objects, a vision training device according to the present invention includes a color filter having an optical property disposed in a field of view direction of an eye of a user, a display, a user operating unit that adjusts image information of the display, and a control unit that causes a reference color image within a range similar to a color of the color filter to be displayed on the display and stores a correction confirmation signal for the display as a correction value when the correction confirmation signal is input through the user operating unit.

23 Claims, 8 Drawing Sheets

(52) U.S. Cl.
CPC .............. *A61H 2201/1607* (2013.01); *A61H 2201/5007* (2013.01); *A61H 2201/5043* (2013.01); *A61H 2205/024* (2013.01); *G09G 2320/0666* (2013.01)

(58) Field of Classification Search
CPC .... A61H 2205/024; A61H 1/00; G06F 3/013; G09G 3/003; G09G 2320/0666; G09G 5/003; G09G 2370/08; G02B 27/01
See application file for complete search history.

(56) References Cited

U.S. PATENT DOCUMENTS

| | | | |
|---|---|---|---|
| 2012/0127426 A1 | 5/2012 | Backus et al. | |
| 2012/0249951 A1* | 10/2012 | Hirayama | A61B 3/032 351/201 |

FOREIGN PATENT DOCUMENTS

| | | |
|---|---|---|
| CN | 102813500 A | 12/2012 |
| CN | 106924019 A | 7/2017 |
| JP | 2016-159075 A | 9/2016 |
| KR | 20090040034 A | 4/2009 |
| KR | 10-0896212 B1 | 5/2009 |
| KR | 10-2012-0053419 A | 5/2012 |
| WO | WO2014-034972 A1 | 3/2014 |

OTHER PUBLICATIONS

Japan Patent Office, Office Action dated Nov. 30, 2021 in Japanese Patent Application No. 2020-531705 (11 pages).
International Searching Authority, "International Search Report," dated Sep. 12, 2018, in International application No. PCT/KR2017/014588.
Chinese Patent Office, Office Action dated May 30, 2022 in Chinese Patent Application No. 201780097617.1 (17 pages).
Chinese Patent Office, Office Action dated Dec. 27, 2022 in Chinese Patent Application No. 201780097617.1 (28 pages).
Chinese Patent Office, Notification to Grant Patent Right of Invention and Notification to Go Through Formalities at Registration dated Mar. 31, 2023 in Chinese Patent Application No. 201780097617.1 (5 pages).

* cited by examiner

[FIG. 1]
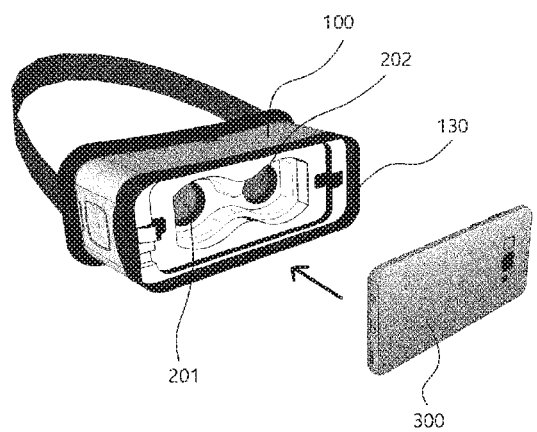
[FIG. 2]
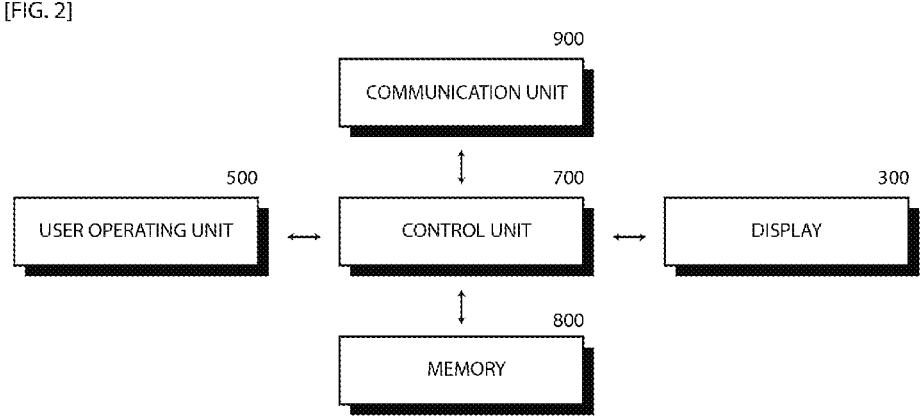

[FIG. 3]
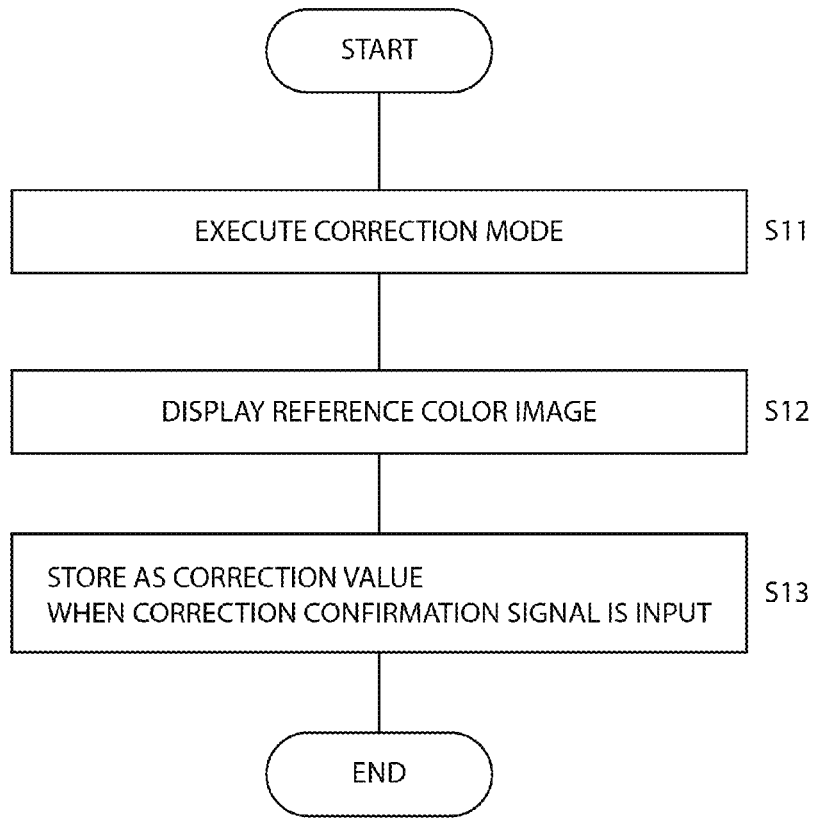
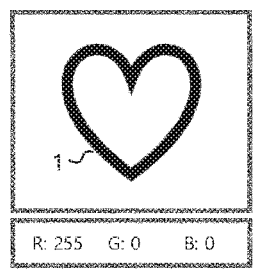
FIG. 4(A)
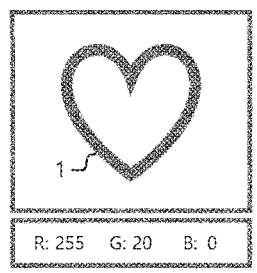
FIG. 4(B)
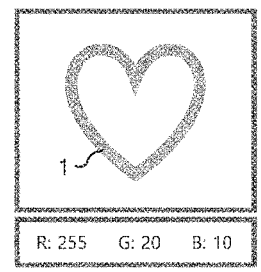
FIG. 4(C)

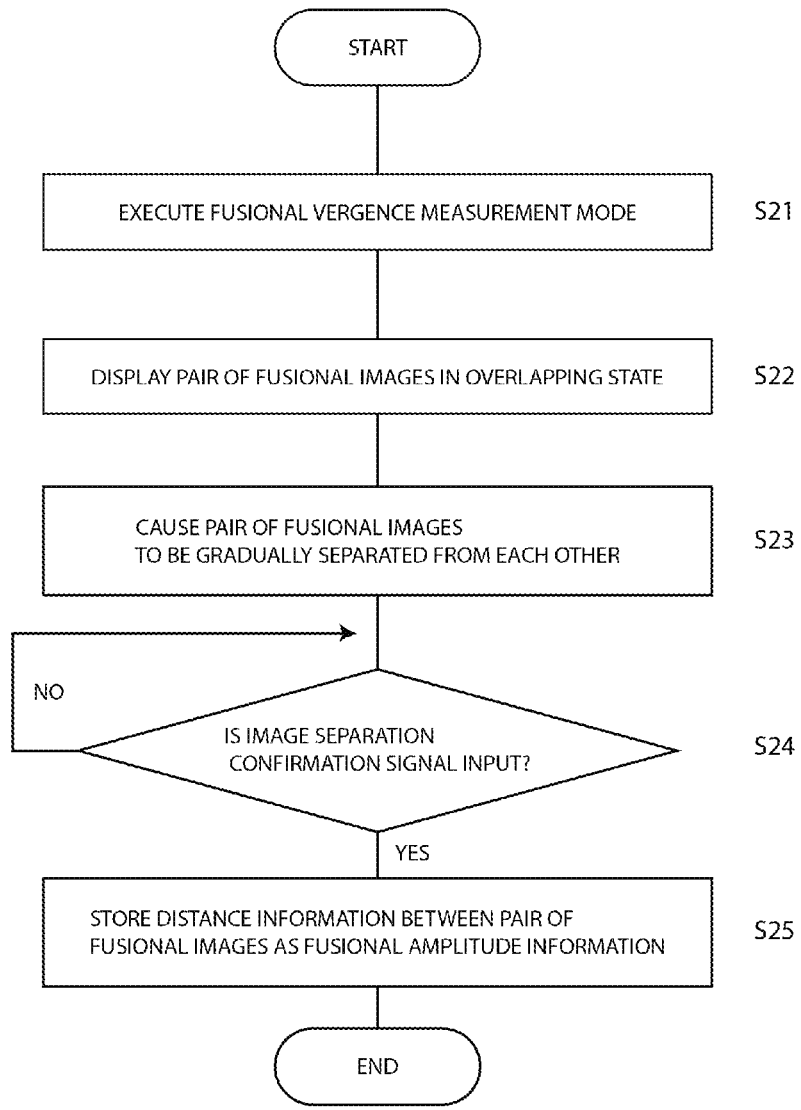

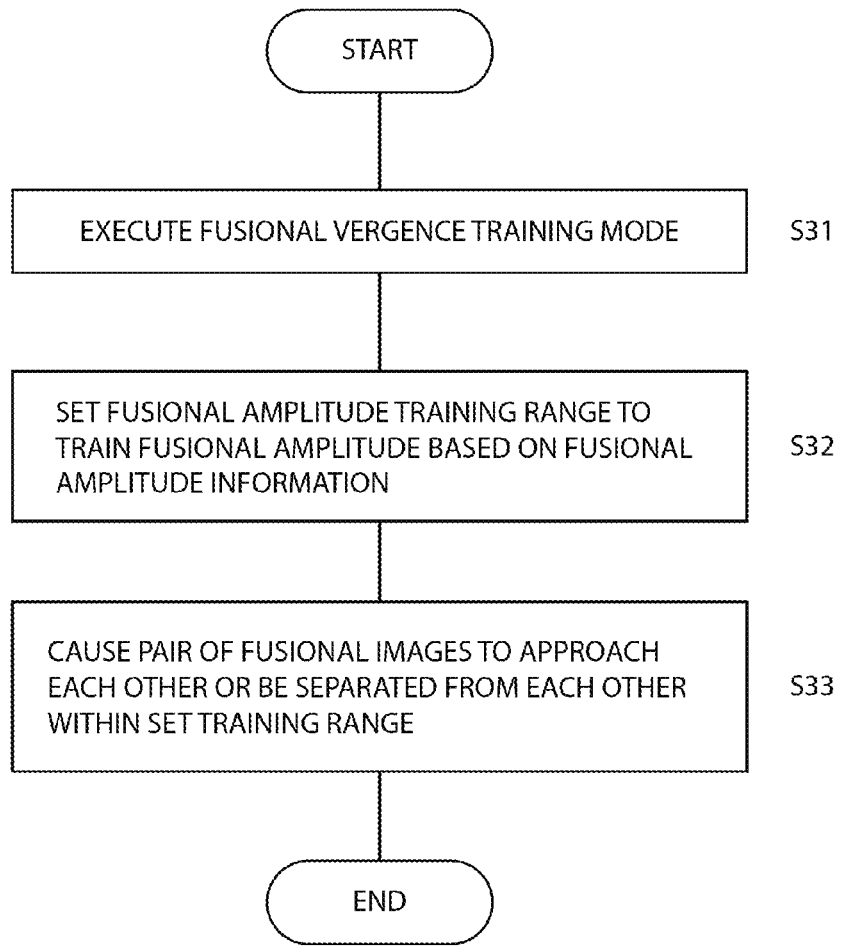

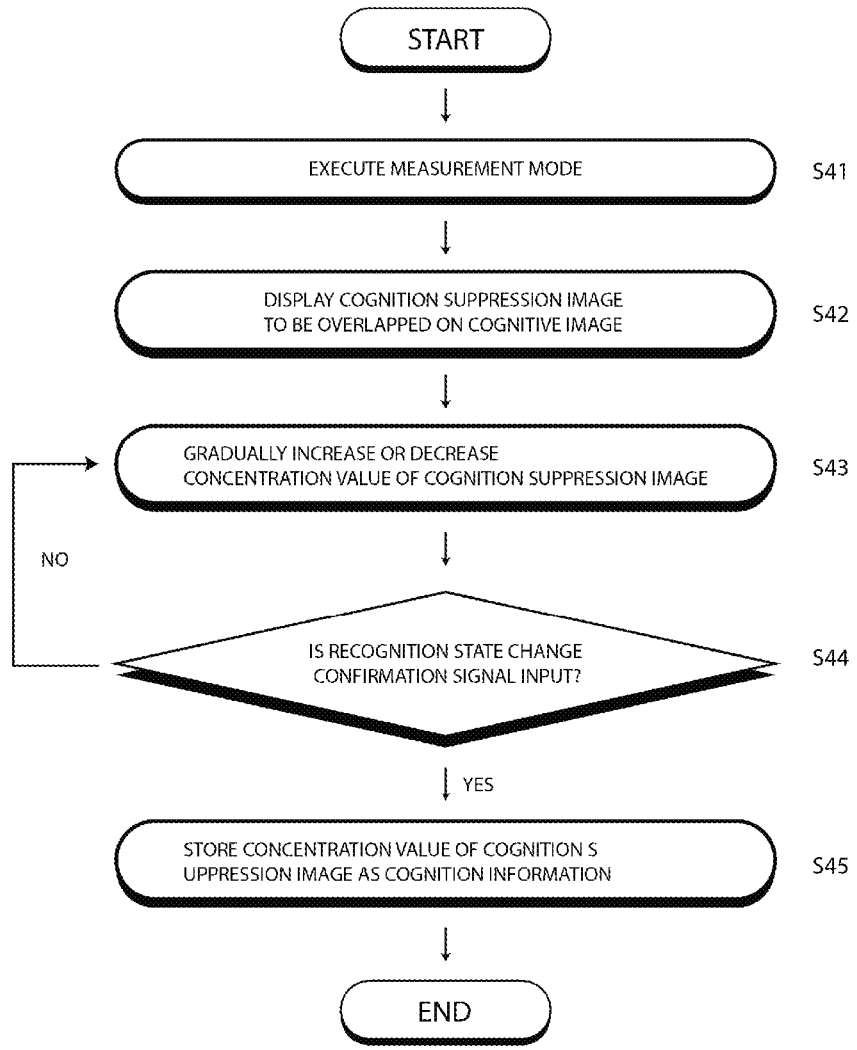

[FIG. 10]
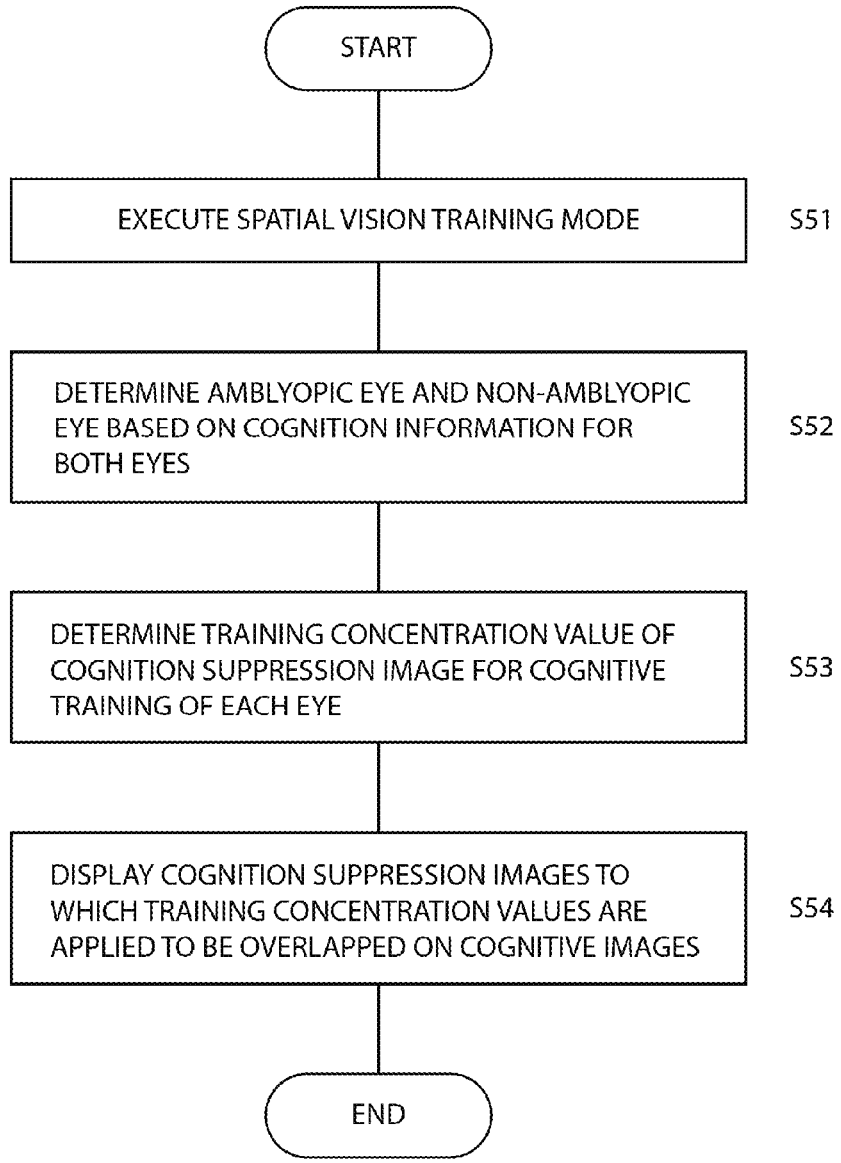

VISION TRAINING DEVICE FOR FUSIONAL VERGENCE AND SPATIAL VISION TRAINING

This application is a continuation of International Application No. PCT/KR2017/014588, filed Dec. 12, 2017. The content of the above application is hereby incorporated by reference.

BACKGROUND

The present invention relates to a vision training device for fusional vergence and spatial vision training.

A vision training device for providing fusional vergence and spatial vision training includes a pair of color filters having a complementary color relation to each other that are disposed in front of both eyes and a display that displays a color corresponding to the color filter and a color having a complementary color relation in front of them. Here, a color of an image displayed on the display is the color corresponding to the color filter, and effective training is performed in a case in which, when a user sees a color image, an eye to which a corresponding color filter is applied is unable to recognize it completely, and it is recognized only through a color filter applied to the other eye.

However, displays on the market have different color characteristics, and users have different color perception abilities, and thus vision training effects are low unless separate color correction is performed before training.

BRIEF SUMMARY

It is an object of the present invention to provide a vision training device capable of performing color correction for a display and providing elaborate vision training.
Task Resolution In order to achieve the above objects, a vision training device according to the present invention includes a color filter having an optical property disposed in a field of view direction of an eye of a user, a display, a user operating unit that adjusts image information of the display, and a control unit that causes a reference color image within a range similar to a color of the color filter to be displayed on the display and stores a correction confirmation signal for the display as a correction value when the correction confirmation signal is input through the user operating unit.

Preferably, the control unit controls the user operating unit such that the image information of the reference color image corresponding to the color filter having the optical property is adjusted.

Preferably, the control unit adjusts at least one of RGB values, transparency, a contrast ratio, and brightness of the reference color image displayed on the display, and stores the correction confirmation signal for the display as the correction value when the correction confirmation signal is input through the user operating unit.

Preferably, the control unit causes a pair of fusional images in which the correction value is reflected to be displayed on the display, controls the display such that the pair of fusional images are separated from each other or approach each other, and stores distance information between the pair of fusional images as fusional amplitude information when an image separation confirmation signal is input through the user operating unit.

Preferably, the control unit causes a cognition suppression image that suppresses visual recognition of the cognitive image to be displayed on the display overlap a cognitive image, controls the display such that a concentration value of the cognition suppression image is changed, and stores the concentration value of the cognition suppression image when a recognition state change confirmation signal is input through the user operating unit as cognition information.

Preferably, the color filter having the optical property is configured to have a polarization or adjacent complementary color relation in which only light vibrating in a grating direction of the filter is passed for separation at binocular vision.

The vision training device are capable of performing color correction for a display and providing elaborate vision training.

BRIEF DESCRIPTION OF THE DRAWINGS

FIG. 1 is a perspective view illustrating a vision training device according to the present invention.

FIG. 2 is a configuration diagram of a vision training device according to the present invention.

FIG. 3 is a flow chart for describing a correction mode according to the present invention.

FIGS. 4A to 4C are reference diagrams for describing a correction mode of FIG. 3.

FIG. 5 is a flow chart for describing a fusional vergence measurement mode for fusional vergence training.

FIG. 7 is a flow chart for describing a fusional vergence training mode.

FIG. 8 is a flowchart for describing a spatial vision measurement mode for spatial vision training.

FIG. 10 is a flowchart for describing a spatial vision training mode.

DETAILED DESCRIPTION OF THE EMBODIMENT(S)

Figure 6A:
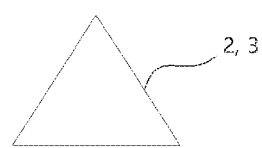
FIGS. 6A to 6B are reference diagrams for describing a fusional vergence measurement mode of FIG. 5.

FIG. 1 is a perspective view illustrating a vision training device according to the present invention. As can be seen in FIG. 1, the vision training device according to the invention includes a frame 100 with eyepiece sections. The frame 100 can be worn on the head of the user. The eyepiece sections are placed in a field of view direction of the eyes of the user, and color filters 201 and 202 with optical properties are mounted in the eyepiece sections. Lenses having various refractive indexes may be installed in the eyepiece sections, overlapping the color filters 201 and 202. Here, the color filters 201 and 202 having a pair of optical properties disposed in front of the eyes employ colors having a mutual complementary or adjacent complementary color relation. For example, when one color filter employs red, the other color filter employs bluish green. This is merely an example, and other colors having a mutually complementary color relation such as yellow and purple may be employed. The color filters 201 and 202 with a pair of optical properties are replaceable.

The frame 100 includes a mounting section 130 in which a display 300 is mounted at a predetermined distance in front of the color filters 201 and 202 having the optical properties mounted in the eyepiece sections. The display 300 is detachably mounted in the mounting section 130. The display 300 may be a dedicated device for vision training or a mobile device in which a vision training program is installed. The vision training device can provide training in a state in which the display 300 is mounted in the frame 100 or detached from the frame 100. In a case in which the training is performed in a state in which the display 300 is detached from the frame 100, it is desirable to perform the training with a proper distance from the eye of the user. For example, it may be carried out with a distance of 1 m or less or may be performed with a distance of 1 m or more as if watching TV in a living room. The display 300 may be configured integrally with the frame 100.

FIG. 2 is a configuration diagram of a vision training device according to the present invention. As illustrated in FIG. 2, the vision training device according to the present invention includes a user operating unit 500 that adjusts image information of the display 300. The image information includes at least one of RGB values, transparency, a contrast ratio, and brightness. The user operating unit 500 is connected to the display 300 via electrical or wireless communication. The user operating unit 500 may be disposed in the frame 100 or the display 300 or may be disposed as a separate component.

The vision training device according to the present invention includes a control unit 700 that causes a reference color image (see FIG. 4) within a range similar to the color of the color filter 201 or 202 to be displayed on the display 300, a communication unit 900 that is connected with an external device and exchanges data with the external device, and a memory 800 that stores various types of data.

The control unit 700 receives color information of each of the color filters 201 and 202 mounted in the frame 100 in advance, and causes, based on the color information of each color filter, a reference color image within a range similar to the color to be displayed on the display 300. For example, when color information indicating that a color of a color lens 202 disposed on the left eye side of the user is a reddish color is received in advance, a color image in which a R value of the RGB values is 255, a G value is 0, and a B value is 0 is displayed on the display 300. This is an example, and the RGB values of the reference color image can be changed according to settings. However, a case in which a reference color image 1 exactly matches the color of each of the color filters 201 and 202 is rare, and colors indicating the RGB values differ for each display 300, so color correction is necessary for more elaborate training.

FIG. 3 is a flowchart for describing a correction mode according to the present invention, and FIGS. 4A to 4C are reference diagrams for describing the correction mode of FIG. 3. The correction mode will be described with reference to FIG. 3 and FIGS. 4A to 4C. The correction mode is performed individually on each of the left eye and the right eye of the user. The order of the correction modes for the left eye and the right eye can be arbitrarily selected by the control unit 700 or selected by the user. For example, the correction mode for the left eye may be performed, and then the correction mode for the right eye may be performed. A blocking film blocking the field of view of the right eye when the correction mode for the left eye is performed may be disposed. The control unit 700 receives the color information for the color filters 201 and 202 disposed in front of the left eye and the right eye in advance. It is desirable that the correction mode be executed when the user performs the vision training for the user for the first time. Of course, the correction mode may arbitrarily be executed by the user.

First, the user executes the correction mode while wearing the vision training device (S11). It is assumed that the correction mode for the left eye corresponding to the reddish color filter 202 out of the left eye and the right eye is executed first. When the correction mode is executed, the control unit 700 causes the reference color image 1 within a range similar to the reddish color corresponding to the color information of the reddish color filter 202 to be displayed on the display 300 (S12).

When the reference color image 1 is displayed on the display 300, the user adjusts at least one of the RGB values, the transparency, the contrast ratio, and the brightness of the display 300 through the user operating unit 500 so that the reference color image 1 displayed on the display 300 is not recognized. For example, it is possible to change at least one of the G value and the B value as illustrated in FIGS. 4B and 4C even in a state in which, among the RGB values displayed on the display, the R value is 255, and the G value and the B value are 0 as illustrated in FIG. 4A. In the case of the reddish color filter 202, it is desirable to adjust at least one of the G value and the B value among the RGB values of the display 300. In the case of a greenish color filter, it is desirable to adjust at least one of the R value and the B value among the RGB values of the display 300. In the case of a bluish color filter, it is desirable to adjust at least one of the R value and the G value among the RGB values of the display 300. As described above, the control unit 700 preferably controls the user operating unit 500 such that at least one of the adjustable RGB values is adjusted according to the color of the color filter.

The adjustment of the transparency, the contrast ratio, and the brightness can be omitted if it is possible to cause the reference color image 1 not to be recognized by adjusting the RGB values. However, if the satisfactory result is not obtained only by the adjustment of the RGB values, the transparency, the contrast ratio and the brightness are adjusted. The adjustment order of the RGB values, the transparency, the contrast ratio and the brightness can be changed. For example, the RGB values may be adjusted after the transparency and the brightness are adjusted.

The control unit 700 may give auditory or visual guidance to sequentially adjust the RGB values, the transparency, the contrast ratio, and the brightness through the display 300 so that at least one of the RGB values, the transparency, the contrast ratio, and the brightness can be easily adjusted.

After adjusting at least one of the RGB values, the transparency, the contrast ratio, and the brightness so that the reference color image 1 displayed on the display 300 is not recognized, the user inputs the RGB values, the transparency, the contrast ratio, and the brightness value which are adjusted as described above to the display 300 as a correction confirmation signal. The control unit 700 stores the input correction confirmation signal in the memory 800 as a correction value (S13).

Meanwhile, instead of adjusting the RGB values or the like of the display 300 directly by the user as described above, the control unit 700 may continuously or intermittently change at least one of the RGB values, the transparency, the contrast ratio, and the brightness of the reference color image 1 displayed on the display 300 and store the correction confirmation signal input through the user operating unit 500 while the reference color image is being changed by the controller 700 as the correction value. When the correction value for the left eye is stored, the correction mode for the right eye is executed. A process of the correction mode for the right eye is identical to the process of the correction mode for the left eye described above.

When the correction value is stored in the correction mode, the control unit 700 applies the RGB values, transparency, the contrast ratio, and the brightness values in which the correction value is reflected so that fusional vergence and spatial vision training is executed. The fusional vergence training is training to improve the ability to fuse images which are recognized separately by the left eye and the right eye separately into one image, and the spatial vision training is training to reduce a phenomenon that only the image recognized by the eye having the higher spatial vision out of the images recognized respectively by the left eye and the right eye is used.

Figure 6B:
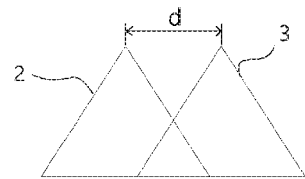

The fusional vergence training will be described below. FIG. 5 is a flowchart for describing a fusional vergence measurement mode for the fusional vergence training, and FIG. 6 is a reference diagram for describing the fusional vergence measurement mode of FIG. 5. The fusional vergence training will be described with reference to FIGS. 5 and 6. The fusional vergence training includes a measurement mode and a training mode. First, when the user executes the fusional vergence measurement mode (S21), the control unit 700 causes a pair of fusional images 2 and 3 having a mutually adjacent complementary color relation to which the correction values previously stored in the correction mode are applied to be displayed on the display 300 in an overlapped state as illustrated in FIG. 6A (S22). Here, a pair of fusional images 2 and 3 are assumed to be a reddish fusional image 2 and a bluish green fusional image 3 having a complementary color relation to which the correction values are applied, respectively. At this time, each eye of the user can recognize only one fusional image out of a pair of fusional images 2 and 3. For example, in a case in which the reddish color filter 202 is disposed for the left eye, the red fusional image 2 is unable to be recognized, and in a case in which the bluish green color filter 201 is disposed for the right eye, the bluish green fusional image 3 is unable to be recognized. In a case in which a pair of fusional images 2 and 3 overlap on each other, the user recognizes a pair of fusional images 2 and 3 as one image. A pair of fusional images 2 and 3 may be slightly separated from each other by a predetermined interval.

Then, the control unit 700 causes a pair of fusional images 2 and 3 to be gradually separated from each other as illustrated in FIG. 6 B (S23). Even through a pair of fusional images 2 and 3 are gradually separated from each other, the user recognizes a pair of fusional images 2 and 3 as one image in which the images are not separated from each other within a predetermined separation range due to fusional vergence specific to the user. Then, the user recognizes a pair of fusional images 2 and 3 as images which are separated from each other at some point time while a pair of fusional images 2 and 3 are being separated from each other.

The control unit 700 checks whether or not an image separation confirmation signal is input through the user operating unit 500 (S24). The user inputs an image separation confirmation signal when a pair of fusional images 2 and 3 are recognized to be separated from each other.

When the image separation confirmation signal is input, the control unit 700 stores distance information d between a pair of fusional images included in the image separation confirmation signal as fusional amplitude information (S25).

An image combination confirmation signal which is input when a pair of fusional images gradually approach each other in a state in which they are separated from each other by a predetermined distance may be measured. In this case, the user inputs the image combination confirmation signal when a pair of fusional images are recognized to be combined with each other. Distance information between a pair of fusional images when the image combination confirmation signal is input can be stored and used as the fusional amplitude information.

FIG. 7 is a flow chart for describing a fusional vergence training mode. The fusional vergence training mode will be described with reference to FIG. 7. First, when the user executes the fusional vergence training mode (S31), a fusional amplitude training range is set based on the previously stored fusional amplitude information (S32). The fusional amplitude training range refers to a moving range in which a pair of fusional images approach each other or are separated from each other. The fusional amplitude training range is preferably set based on the distance information between the fusional images in the fusional amplitude information measured in the fusional amplitude measurement mode.

Then, the control unit 700 controls the display 300 such that that a pair of fusional images 2 and 3 approach each other or are separated from each other within the set training range (S33). The fusional vergence training is performed such that the images recognized by both eyes of the user enter the fused state and the non-fused state alternately or separation is repetitively performed within a maximum range based on the measured fusional amplitude information, whereby the fusional vergence of the user is improved.

Further, in the fusional vergence measurement and training, the same separation effect at binocular vision as the color filter having the optical properties including the complementary color relation or the adjacent complementary color relation can be implemented using one or more polarizing filters for each eye, and a grating direction of the polarizing filter can be automatically set according to the polarization characteristics of the display 300 or can be adjusted through the user operating unit 500.

Meanwhile, spatial vision training includes a measurement mode and a training mode. The spatial vision measurement mode is executed individually on each of the left eye and right eye. A blocking film blocking the field of view of the right eye when the spatial vision measurement mode for the left eye is first performed may be disposed.

Figure 9A:
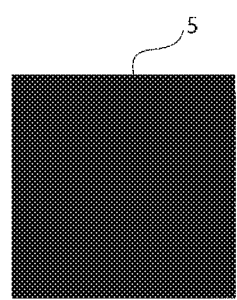
FIGS. 9A to 9B are reference diagrams for describing a spatial vision measurement mode of FIG. 8.

FIG. 8 is a flowchart illustrating the spatial vision measurement mode for the spatial vision training, and FIG. 9 is a reference diagram for describing the spatial vision measurement mode of FIG. 8. The spatial vision training will be described with reference to FIGS. 8 and 9. First, it is assumed that the spatial vision measurement mode of the left eye for which the reddish color filter 202 is disposed is executed first. When the user executes the spatial vision measurement mode (S41), the control unit 700 causes a black cognitive image 4 and a reddish cognition suppression image 5 in which the correction value is reflected in the cognitive image 4 to be displayed on the display 300 in an overlapping manner (S42). At this time, an initial concentration of the overlapping cognition suppression image 5 is set to a concentration value of 100% that completely blocks recognition of the cognitive image 4 as illustrated in FIG. 9A.

Figure 9B:
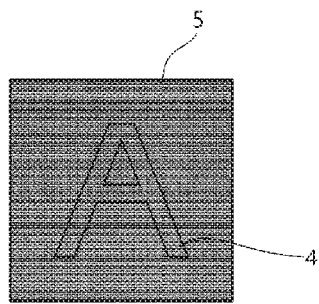

Then, the control unit 700 controls the display 300 such that the concentration value of the cognition suppression image 5 gradually decreases as illustrated in FIG. 9B (S43). As the concentration value of the cognition suppression image 5 decreases, the black cognitive image 4 hidden by the cognition suppression image 5 becomes visible gradually. Here, the control unit 700 may control the display 300 such that the concentration value of the cognition suppression image 5 decreases intermittently at a predetermined rate or may control the display 300 such that the concentration value of the cognition suppression image 5 decreases continuously.

The control unit 700 checks whether or not a recognition state change confirmation signal is input from the user operating unit 500 while the concentration value of the cognition suppression image 5 is being changed (S44). The recognition state change confirmation signal is a signal which is input through the user operating unit 500 when the user recognizes the cognitive image 4 while the concentration value of the cognition suppression image 5 is being changed. The recognition state change confirmation signal includes information of the concentration value when it is input by the user. The concentration value may include the RGB values, the transparency, the contrast ratio, and the brightness information.

When the recognition state change confirmation signal is input, the control unit 700 stores the concentration value included in the recognition state change confirmation signal as cognition information (S45). Then, the cognition information of the opposite eye out of a pair of eyes is also measured and stored in the same manner as described above.

Meanwhile, the recognition information can be measured while increasing the concentration of the cognition suppression image 5 from 0% instead of starting from 100%. In this case, the user can recognize the cognitive image 4 from the beginning. However, as the concentration value of the cognition suppression image gradually increases, the user is unable to recognize the cognitive image 4. In this case, the recognition state change confirmation signal is input when the user does not recognize the cognitive image 4.

FIG. 10 is a flowchart for describing the spatial vision training mode. The spatial vision training mode will be described with reference to FIG. 10. First, when the user executes the spatial vision training mode (S51), an amblyopic eye and a non-amblyopic eye are determined based on the previously stored cognition information for both eyes (S52). Here, the eye which is lower in the concentration value included in the cognition information of each eye is determined as the amblyopic eye, and the eye which is higher in the concentration value included in the cognition information of each eye is determined as the non-amblyopic eye.

When the amblyopic eye and the non the non-amblyopic eye are determined for both eyes, a training concentration value of the cognition suppression image for the cognitive training of each eye is set (S53). At this time, the training concentration value of the amblyopic eye is set to be higher than the measured concentration value by a predetermined value, and the training concentration value of the non-amblyopic eye is set to be lower than the measured concentration value by a predetermined value. For example, when the measured concentration value of the amblyopic eye is 70%, the concentration value of 71 to 75% is set as the training concentration value, and when the measured concentration value of the non-amblyopic eye is 80%, the concentration value of 70 to 79% is set to the training concentration value.

The cognition suppression images having the training concentration values of the amblyopic eye and the non-amblyopic eye determined as described above are overlapped on the respective black cognitive image and displayed on the display 300 (S54). That is, an image in which the cognitive suppression image having the training concentration value of the amblyopic eye is overlapped on the black cognitive image and an image in which the cognition suppression image having the training concentration value of the non-amblyopic eye is overlapped on the black cognitive image are displayed on the display 300 at the same time. In this case, since red and bluish green have a complementary color relation, the images on which the cognition suppression images having the complementary color relation with the color filters 201 and 202 are overlapped are seen to be black and unable to be recognized. For example, when the reddish color filter 202 is disposed for the left eye, the cognitive image on which the bluish green cognition suppression image is overlapped is unable to be visually recognized. However, the left eye can see the cognitive image on which the red cognition suppression image to which the training concentration value is applied is overlapped. On the other hand, when the blue-green color filter 201 is disposed for the right eye, the cognitive image on which the reddish cognition suppression image is overlapped is unable to be visually recognized. However, the right eye can see the cognitive image on which the bluish green cognition suppression image to which the training concentration value is applied is overlapped.

As the training concentration value of the amblyopic eye is set to be higher than the measured concentration value as described above, the user exerts a high concentration to visually recognize the cognitive image through the amblyopic eye. Accordingly, it is possible to train the spatial vision of the amblyopic eye as the high concentration is required. Here, the training concentration value may be set to change within a predetermined range. As described above, it is desirable to train both eyes at the same time through the spatial vision training. The spatial vision training may also be performed on each eye.

Further, in the spatial vision measurement and training, the same separation effect at binocular vision as the color filter having the optical properties including the complementary color relation or the adjacent complementary color relation can be implemented using one or more polarizing filters for each eye. In addition, the polarizing filter may be configured to have a double-layer structure in which one of them is fixed, and the other is rotatable, and the double polarizing filter structure may be adjusted to have a relation in which an angle between the gratings of the fixed polarizing filter and the rotatable polarizing filter is between 0 degrees to 90 degrees. In this case, the same effects as the spatial vision measurement and training performed using the color filters having the optical property having the complementary color relation or the adjacent complementary color relation are obtained.

In addition, a filter including one or more polarizing filters for each eye can adjust a grating relation of the polarizing filter corresponding to the value of the recognition state change confirmation signal input through the user operating unit. Of course, a dual polarizing filter in which both filters are rotatable may be configured.

What is claimed is:
1. A system comprising:
a chassis;
a first optical filter and a second optical filter, wherein: (a) the first and second optical filters are both included within the chassis, (b) the first optical filter has a first color and the second optical filter has a second color, (c) the first color is defined by a first red, green blue (RGB) value that is based on a combination of a first red value, a first green value, and a first blue value, (d) the second color is defined by a second RGB value that is based on a combination of a second red value, a second green value, and a second blue value, and (e) the first RGB value is unequal to the second RGB value;
at least one non-transitory machine-readable medium having stored thereon data which, when used by at least one machine, causes the at least one machine to perform operations comprising:

storing the first RGB value in the at least one non-transitory machine-readable medium;

displaying an image on an electronic display while a line of sight between the electronic display and the second optical filter is obstructed;

changing a first display characteristic for the image based on the stored first RGB value, wherein the first display characteristic includes at least one of RGB value, transparency, contrast ratio, brightness, or combinations thereof;

receiving a communication corresponding to a user being unable to recognize the image based on the changed first display characteristic;

storing the changed first display characteristic in the at least one non-transitory machine-readable medium;

conducting optical training with the user based on the stored changed first display characteristic.

2. The system of claim 1 wherein the first color is more red than green and the second color is more green than red.

3. The system of claim 1 wherein the chassis includes a coupler for coupling the electronic display at a fixed distance from the first and second optical filters.

4. The system of claim 1 wherein changing a first display characteristic for the image comprises changing the first display characteristic for the image in response to a manual input by the user, the manual input causing an adjustment of the first display characteristic.

5. The system of claim 1, wherein the optical training includes at least one of fusional vergence training, spatial vision training, or combinations thereof.

6. The system of claim 1, the operations comprising:

displaying a first fusional vergence image and a second fusional vergence image, wherein: (a) the first fusional vergence image has a first fusional vergence color that is based on both the stored changed first display characteristic and the first RGB value, and (b) the second fusional vergence image has a second fusional vergence color that is based on both an additional changed first display characteristic and the second RGB value;

overlapping the displayed first and second fusional vergence images with each other;

moving the displayed first and second fusional vergence images away from each other; receiving a communication regarding fusional vergence in response to moving the displayed first and second fusional vergence images away from each other;

determining a fusional vergence distance between the first and second fusional vergence images in response to receiving a communication regarding fusional vergence.

7. The system of claim 6, the operations comprising:

performing fusional vergence training in response to determining the fusional vergence distance;

wherein performing fusional vergence training in response to determining the fusional vergence distance comprises, in response to determining the fusional vergence distance, varying a distance between at least one of: (a) the first and second fusional vergence images, (b) additional first and second vergence images, (c) or combinations thereof.

8. The system of claim 6, wherein receiving the communication regarding fusional vergence corresponds to the user visually separating the first and second fusional vergence images from each other.

9. The system of claim 1, the operations comprising:

displaying a first fusional vergence image and a second fusional vergence image, wherein: (a) the first fusional vergence image has a first fusional vergence color that is based on both the stored changed first display characteristic and the first RGB value, and (b) the second fusional vergence image has a second fusional vergence color that is based on an additional changed first display characteristic and the second RGB value;

moving the displayed first and second fusional vergence images with regard to each other by at least one of: (a) moving the displayed first and second fusional vergence images towards each other, or (b) moving the displayed first and second fusional vergence images away from each other;

receiving a communication regarding fusional vergence in response to moving the displayed first and second fusional vergence images with regard to each other; and determining a fusional vergence distance between the first and second fusional vergence images in response to receiving a communication regarding fusional vergence.

10. The system of claim 1, the operations comprising:

displaying a first spatial vision image and a second spatial vision image while the line of sight between the electronic display and the second optical filter is obstructed, wherein: (a) the first spatial vision image has a first spatial vision color that is based on both the stored changed first display characteristic and the first RGB value, and (b) the second spatial vision image has a second spatial vision color;

overlapping the displayed first and second spatial vision images with each other;

while the first and second spatial vision images are overlapped with each other, changing a second display characteristic for at least one of the first or second spatial vision images, wherein the changed second display characteristic includes at least one of RGB value, transparency, contrast ratio, brightness, or combinations thereof;

receiving a communication regarding spatial vision in response to changing the second display characteristic for at least one of the first or second spatial vision images;

determining the changed second display characteristic for at least one of the first or second spatial vision images in response to receiving the communication regarding spatial vision and storing the changed first display characteristic in the at least one non-transitory machine-readable medium.

11. The system of claim 10, wherein receiving a communication regarding spatial vision in response to changing a second display characteristic for at least one of the first or second spatial vision images corresponds to the user visually separating the first and second spatial vision images from each other.

12. The system of claim 10, the operations comprising:

displaying an additional first spatial vision image and an additional second spatial vision image while a line of sight between the electronic display and the first optical filter is obstructed, wherein: (a) the additional first spatial vision image has an additional first spatial vision color that is based on both an additional changed first display characteristic and the second RGB value, and (b) the additional second spatial vision image has an additional second spatial vision color;

overlapping the displayed additional first and second spatial vision images with each other;

while the additional first and second spatial vision images are overlapped with each other, changing an additional second display characteristic for at least one of the additional first or second spatial vision images, wherein the additional second display characteristic includes at least one of RGB value, transparency, contrast ratio, brightness, or combinations thereof;

receiving an additional communication regarding spatial vision in response to changing the additional second display characteristic for at least one of the additional first or second spatial vision images;

determining the additional changed second display characteristic for at least one of the first or second additional spatial vision images in response to receiving the additional communication regarding spatial vision and storing the additional changed second display characteristic in the at least one non-transitory machine-readable medium.

13. The system of claim 12, the operations comprising comparing the changed second display characteristic with the additional changed second display characteristic.

14. The system of claim 13, the operations comprising determining one of the user's eyes is more amblyopic than another of the user's eyes in response to comparing the changed second display characteristic with the additional changed second display characteristic.

15. The system of claim 13, the operations comprising:
displaying an added first spatial vision image, an added second spatial vision image, and an added third spatial vision image, wherein: (a) the added first spatial vision image is displayed based on the changed second display characteristic, and (b) the added second spatial vision image is displayed based on the additional changed second display characteristic;
simultaneously overlapping the displayed added third spatial vision image with the added first spatial vision image while at the same time simultaneously overlapping the displayed added third spatial vision image with the added second spatial vision image.

16. The system of claim 15, comprising:
displaying the added first spatial vision image while adjusting an adjustable display characteristic for the added first spatial vision image, wherein the adjustable display characteristic for the added first spatial vision image includes at least one of RGB value, transparency, contrast ratio, brightness, or combinations thereof;
displaying the added second spatial vision image while adjusting an adjustable display characteristic for the added second spatial vision image, wherein the adjustable display characteristic for the added second spatial vision image includes at least one of RGB value, transparency, contrast ratio, brightness, or combinations thereof.

17. At least one non-transitory machine-readable medium having stored thereon data which, when used by at least one machine, causes the at least one machine to perform operations comprising:
displaying an image on an electronic display;
changing a first display characteristic for the image based on a first red, green, blue (RGB) value corresponding to a first optical filter, wherein the first display characteristic includes at least one of a RGB value, transparency, contrast ratio, brightness, or combinations thereof;
receiving a communication corresponding to a user being unable to recognize the image based on the changed first display characteristic;
storing the changed first display characteristic in the at least one non-transitory machine-readable medium;
conducting optical training with the user based on the stored changed first display characteristic.

18. The at least one non-transitory machine-readable medium of claim 17, the operations comprising:
displaying a first fusional vergence image and a second fusional vergence image, wherein: (a) the first fusional vergence image has a first fusional vergence color that is based on both the stored changed first display characteristic and the first RGB value, and (b) the second fusional vergence image has a second fusional vergence color that is based on an additional changed first display characteristic and a second RGB value corresponding to a second optical filter;
moving the displayed first and second fusional vergence images with regard to each other by at least one of: (a) moving the displayed first and second fusional vergence images towards each other, (b) moving the displayed first and second fusional vergence images away from each other;
receiving a user communication regarding fusional vergence in response to moving the displayed first and second fusional vergence images with regard to each other;
determining a fusional vergence distance between the first and second fusional vergence images in response to receiving the user communication regarding fusional vergence.

19. The at least one non-transitory machine-readable medium of claim 18, the operations comprising:
performing fusional vergence training in response to determining the fusional vergence distance;
wherein performing fusional vergence training in response to determining the fusional vergence distance comprises, in response to determining the fusional vergence distance, varying a distance between at least one of: (a) the first and second fusional vergence images, (b) additional first and second vergence images, or (c) combinations thereof.

20. The at least one non-transitory machine-readable medium of claim 17, the operations comprising:
displaying a first spatial vision image and a second spatial vision image, wherein: (a) the first spatial vision image has a first spatial vision color that is based on both the stored changed first display characteristic and the first RGB value, and (b) the second spatial vision image has a second spatial vision color;
overlapping the displayed first and second spatial vision images with each other;
while the first and second spatial vision images are overlapped with each other, changing a second display characteristic for at least one of the first or second spatial vision images, wherein the changed second display characteristic includes at least one of RGB value, transparency, contrast ratio, brightness, or combinations thereof;
receiving a communication regarding spatial vision in response to changing the second display characteristic for at least one of the first or second spatial vision images;
determining the changed second display characteristic for at least one of the first or second spatial vision images in response to receiving the communication regarding spatial vision and storing the changed first display characteristic in the at least one non-transitory machine-readable medium.

21. The at least one non-transitory machine-readable medium of claim 20, the operations comprising:
- displaying an additional first spatial vision image and an additional second spatial vision image, wherein: (a) the additional first spatial vision image has an additional first spatial vision color that is based on both the an additional changed first display characteristic and a second RGB value corresponding to a second optical filter, and (b) the additional second spatial vision image has an additional second spatial vision color;
- overlapping the displayed additional first and second spatial vision images with each other;
- while the additional first and second spatial vision images are overlapped with each other, changing an additional second display characteristic for at least one of the additional first or second spatial vision images, wherein the additional second display characteristic includes at least one of RGB value, transparency, contrast ratio, brightness, or combinations thereof;
- receiving an additional communication regarding spatial vision in response to changing the additional second display characteristic for at least one of the additional first or second spatial vision images;
- determining the additional changed second display characteristic for at least one of the first or second additional spatial vision images in response to receiving the additional communication regarding spatial vision and storing the additional changed second display characteristic in the at least one non-transitory machine-readable medium.

22. The at least one non-transitory machine-readable medium of claim 21, the operations comprising comparing the changed second display characteristic with the additional changed second display characteristic.

23. The at least one non-transitory machine-readable medium of claim 22, the operations comprising:
- displaying an added first spatial vision image, an added second spatial vision image, and an added third spatial vision image, wherein: (a) the added first spatial vision image is displayed based on the changed second display characteristic, and (b) the added second spatial vision image is displayed based on the additional changed second display characteristic;
- simultaneously overlapping the displayed added third spatial vision image with the added first spatial vision image while at the same time simultaneously overlapping the displayed added third spatial vision image with the added second spatial vision image;
- displaying the added first spatial vision image while adjusting an adjustable display characteristic for the added first spatial vision image, wherein the adjustable display characteristic for the added first spatial vision image includes at least one of RGB value, transparency, contrast ratio, brightness, or combinations thereof; and
- displaying the added second spatial vision image while adjusting an adjustable display characteristic for the added second spatial vision image, wherein the adjustable display characteristic for the added second spatial vision image includes at least one of RGB value, transparency, contrast ratio, brightness, or combinations thereof.

* * * * *